(12) United States Patent
Chung

(10) Patent No.: US 11,863,528 B1
(45) Date of Patent: Jan. 2, 2024

(54) GLUE LAYER THAT ABSTRACTS DYNAMIC ENDPOINTS TO STATIC ENDPOINTS

(71) Applicant: Amazon Technologies, Inc., Seattle, WA (US)

(72) Inventor: Peter Chung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 992 days.

(21) Appl. No.: 16/002,966

(22) Filed: Jun. 7, 2018

(51) Int. Cl.
| | |
|---|---|
| *G06F 15/16* | (2006.01) |
| *H04L 9/40* | (2022.01) |
| *H04L 61/2521* | (2022.01) |
| *H04L 69/22* | (2022.01) |
| *H04L 67/1036* | (2022.01) |
| *H04L 61/4511* | (2022.01) |

(52) U.S. Cl.
CPC ...... *H04L 63/0263* (2013.01); *H04L 61/2528* (2013.01); *H04L 61/4511* (2022.05); *H04L 63/0236* (2013.01); *H04L 63/0281* (2013.01); *H04L 63/101* (2013.01); *H04L 67/1036* (2013.01); *H04L 69/22* (2013.01)

(58) Field of Classification Search
CPC ............. H04L 63/0263; H04L 63/0236; H04L 63/0281; H04L 63/101; H04L 61/1511; H04L 61/2528; H04L 67/1036; H04L 69/22
USPC .................................. 709/245–246, 238–239
See application file for complete search history.

(56) References Cited

U.S. PATENT DOCUMENTS

| | | | | |
|---|---|---|---|---|
| 6,711,623 | B1* | 3/2004 | Furukawa | H04L 61/4511 709/245 |
| 7,984,163 | B2* | 7/2011 | Almog | H04L 61/4511 709/238 |
| 10,439,899 | B2* | 10/2019 | Agrawal | H04L 41/5016 |
| 10,609,081 | B1* | 3/2020 | Appala | H04L 61/4511 |
| 2005/0169282 | A1* | 8/2005 | Wittman | H04L 63/0227 370/401 |
| 2009/0064307 | A1* | 3/2009 | Holar | H04L 63/0281 726/12 |
| 2009/0265541 | A1* | 10/2009 | Ylitalo | H04L 61/103 713/151 |
| 2018/0077121 | A1* | 3/2018 | Gordon | H04L 63/0281 |
| 2019/0081854 | A1* | 3/2019 | Pham | H04L 63/0236 |
| 2019/0132207 | A1* | 5/2019 | Nataraj | H04L 69/22 |

* cited by examiner

*Primary Examiner* — Bharat Barot
(74) *Attorney, Agent, or Firm* — Davis Wright Tremaine LLP

(57) ABSTRACT

A system and method for generating a set of destination IP address to be added into a firewall whitelist. The system receives a network packet transmitted through a firewall and determines whether the destination address of the network packet corresponds to at least one of computing resource of a plurality of computing resources. If so, the system transforms the destination address of the packet to another destination address of the corresponding computing resource. The system forwards the network packet to the destination address of the corresponding computing resource.

21 Claims, 9 Drawing Sheets

GLUE LAYER THAT ABSTRACTS DYNAMIC ENDPOINTS TO STATIC ENDPOINTS

BACKGROUND

In a large distributed computing system of a computing resource service provider, various customers, users, services, and resources of the computing resource service provider are in frequent communication with each other. To keep systems secure, a firewall can be utilized which determines whether to allow communication across itself between a client computer and a resource of the computing resource service provider. For instance, a firewall access control list can be created to allow certain candidate network packets to be forwarded across the firewall from one side of the firewall to the other side of the firewall toward its destination.

As part of its services, a computer resource service provider provides resources which can be dynamically commissioned or decommissioned based on the needs of the customers including network traffic volume and computing capacity. To communicate with outside networks, instantiated virtual resources can be assigned with their own domain and Internet Protocol (IP) addresses. Even when communication with the virtual resources is desirable, however, it is difficult to constantly update the firewall rules to allow domain addresses of virtual resources which can be commissioned or decommissioned at any time. At large scales, effective management of firewall rules involve considerable complexity and requires considerable resources.

BRIEF DESCRIPTION OF THE DRAWINGS

Various techniques will be described with reference to the drawings, in which.

DETAILED DESCRIPTION

Figure 1:
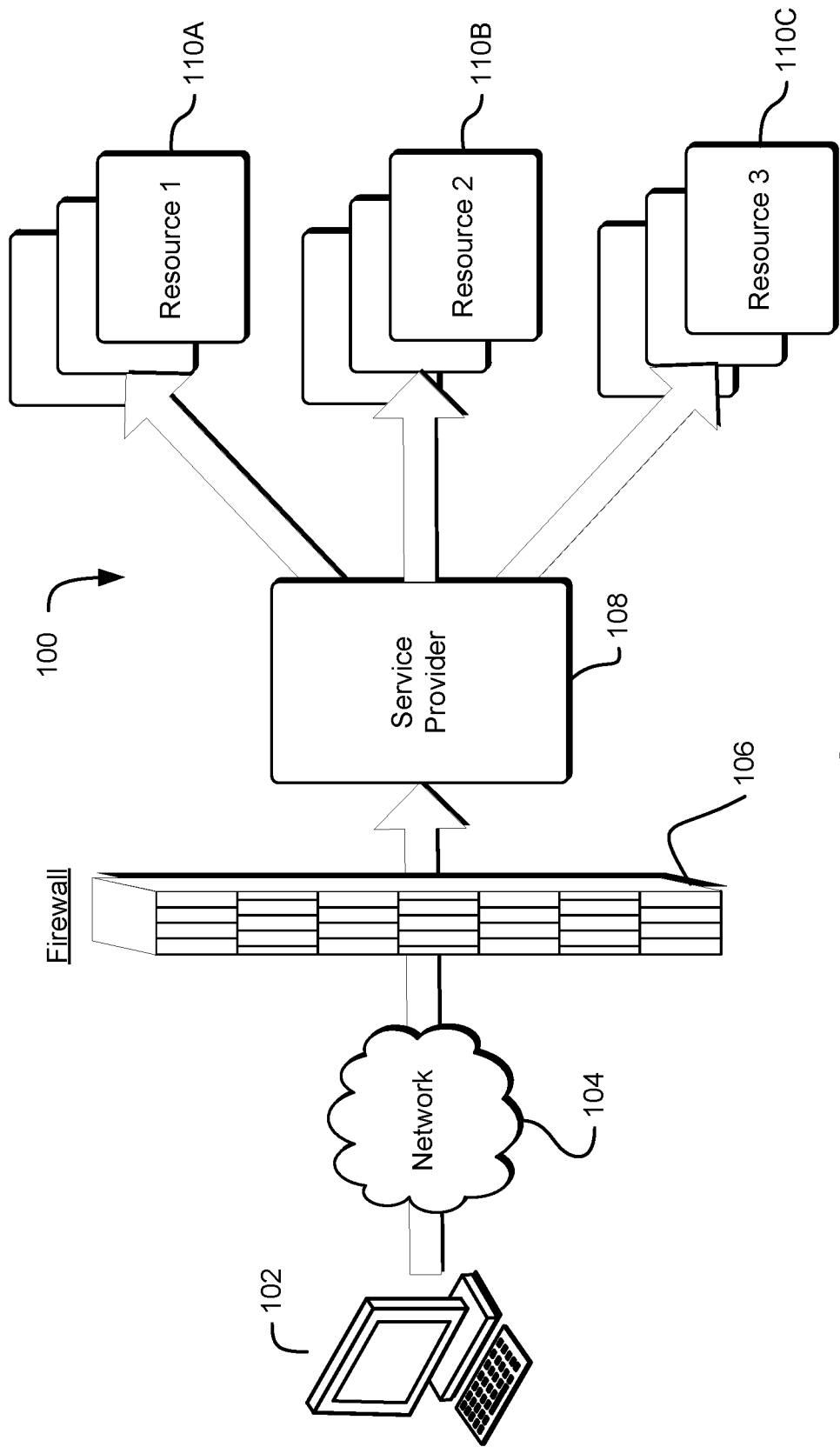
FIG. 1 illustrates an example diagram of a system in which a client communicates with a plurality of virtual computing resources through firewall in accordance with an embodiment.

Techniques described and suggested herein include systems, methods, and processes for a reverse proxy service which assigns a destination IP address to a plurality of virtual computing resources and provides such destination IP address to be added into the firewall access control list ("ACL"), such as a firewall allowlist. More specifically, the reverse proxy service can associate a reverse proxy with a plurality of virtual computing resource endpoints, assign a destination IP address to the reverse proxy, and provide the destination IP address to be added into the firewall so that such destination IP address can be allowlisted. Once the destination IP address is added into the firewall allowlist, the client computer may communicate with the virtual computing resources without the need of constantly updating the firewall as the virtual computing resources are added dynamically.

To access the virtual computing resources of the resource service provider, the client computer may send a network packet including a destination identifier such as the domain name of the resource service provider. The Domain Name System ("DNS") server receives the domain name of the packet and translates the domain name into the destination IP address. Thereafter, the destination IP address is to determine whether it is listed in the firewall allowlist or otherwise satisfies a set of security rules being applied to the firewall. If so, the destination IP address can be forwarded to the reverse proxy service for further processing. If the destination IP address is not listed in the firewall allowlist, the packet can be blocked instead.

Once the packet arrives through the firewall, the load balancer component of the reverse proxy service first determines the reverse proxy based on the destination IP address of the packet. As described above, the determined reverse proxy may include a plurality of virtual computing resources that to which the packet can be forwarded. The load balancer component may then select a reverse proxy that can process the packet sent from the client computer and transmit the packet to the selected reverse proxy. The selected reverse proxy then obtains the domain name associated with the received packet and performs a DNS lookup to identify the actual IP address of the resource. In some embodiments, the selected reverse proxy may determine the domain name of the virtual computing resource, such as a fully qualified domain name (FQDN), then perform a DNS lookup to identify the actual IP address of the resource. Once the resource IP address is identified, the reverse proxy service transforms the destination IP address of the packet to the resource IP address and forwards the packet to the resource IP address. In addition, the reverse proxy may continue to dynamically update its egress rules based on another DNS, which the egress rules specify how the network packets are to be forwarded to the computing resources.

In one example, a user builds a client-side vendor application which requires access to an item price database provided by a computer resource service provider. The vendor application first sends a packet containing the database query through the network which includes the domain name of the computer resource service provider. The DNS server first intercepts the packet and translates the domain name into a destination IP address. The firewall then determines whether the destination IP address is within the firewall allowlist, and if so, forwards the packet to the reverse proxy service of the service provider. In response to receiving the packet through the firewall, the load balancer of the reverse proxy service selects a reverse proxy component that can forward the packet to a virtual computing resource that contains the item price database. The reverse proxy component of the reverse proxy service may then translate the domain name of the packet into the IP address of the virtual computing resource. Finally, the reverse proxy component may forward the packet to the virtual computing resource using the translated IP address. The database being executed within the virtual computing resource can provide a response to the database query back to the vendor application.

As one skilled in the art will appreciate in light of this disclosure, certain embodiments may be capable of achieving certain advantages. For example, techniques of this disclosure enable simplified management of control of egress to the Internet, especially when the techniques are employed with legacy infrastructure environments. Also, techniques disclosed herein improve the security of the computer networks by minimizing the possible number of IP addresses, ports, and domains listed under the firewall ACL. In addition, the reverse proxy service as illustrated in the embodiments may increase compatibility between legacy firewall systems and modern virtual computing resource systems, because adding a limited number of destination IP addresses to the firewall systems can account for the dynamic nature of virtual computing resources which can be added or removed at any time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details.

FIG. 1 illustrates an example diagram of a system 100 in which a client 102 communicates with a plurality of virtual computing resources 110A/B/C through firewall 106 in accordance with an embodiment. To access the services of or otherwise communicate with resources 110A/B/C, client 102 may generate a network packet through a web browser or through any client-side application. A network packet can be any request for data provided by resources 110A/B/C. In some implementations, a network packet may include user credentials (e.g., a username, password, etc.) needed to be authenticated by resources 110A/B/C. In other implementations, a network packet generated by client 102 may be an application programming interface (API) call which may contain several parameters to indicate which data the resources 110A/B/C should provide. The network packet generated by client 102 may include destination identifier, typically in the form of a domain name may include several other characters, numbers, and/or strings indicative of a destination. For example, the destination identifier may include email addresses, accounts associated the computing resources, or any other identification strings capable of being translated to an IP address to allow the network packets to reach the intended destination. In several embodiments, the destination IP address is an IP address generated specifically by the service provider 108 to route network packets to any of the resources 110A/B/C without exposing the IP addresses of such resources back to the client 102. In one embodiment in which the destination information is a domain name, the client sends the domain name to the DNS which associates the domain names to the appropriate destination IP addresses.

The firewall 106 may reside on the client 102, on the service provider 108, or separately on the network 104 which can intercept network packets and determine whether the packets are permitted or otherwise allowed to be transmitted. The firewall 106 may be a network security system that monitors and controls incoming and outgoing network traffic based on predetermined security rules. In one embodiment, the firewall 106 examines each network packet transmitted by the client 102 and then passes the packet through to the other side unchanged, drops the packet entirely, or handles the packet itself in some way. In many implementations, the firewall 106 typically performs its operations based on IP source and destination addresses and port numbers of the endpoint devices. For example, the firewall 106 may block packets from the Internet side that claim a source address of a system on the internal network, block TELNET or RLOGIN connections from the Internet to the internal network, block SMTP and FTP connections to the Internet from internal systems not authorized to send email or move files, act as an intermediate server in handling SMTP and HTTP connections in either direction, or require the use of an access negotiation and encapsulation protocol to gain access to the Internet, to the internal network, or both. In some instances, the firewall 106 can be a protocol end point which may implement a "safe" subset of the protocol, perform extensive protocol validity checks, use an implementation methodology designed to minimize the likelihood of bugs, and/or run in an insulated, "safe" environment.

In several embodiments, the firewall 106 may adopt different firewall models, including a blocklist or allowlist model. In the blocklist model, the firewall 106 may permit all network traffic except for a subset of IP addresses that are blocked. For systems that require enhanced security, however, the firewall 106 may implement a allowlist model, where communications are blocked by default with only a subset of IP addresses is allowed. In both instances, the firewall 106 may include a set of security rules that determine the egress behavior of the network packets entering through the firewall. If the set of security rules are applied and satisfied, the firewall 106 may forward the network packet to the intended destination.

In an embodiment, the service provider 108 may be an integrating service, a web services provider, a cloud computing platform, an application server, an infrastructure-as-a-service (IaaS) platform, or any other appropriate network-based service provider. The service provider 108 may allocate network packets to a plurality computing resources, which can be incorporated into one or more client-end or back-end applications that provide other services such as personal assistant voice service, a calendar service, a shopping service, an email or messaging service, a navigation service, or any other appropriate service hosted on a public or private network. The service provider 108 can receive network packets transmitted through the firewall 106 and determine the destination IP address of the network packets. Based on the destination IP address, the service provider 108 may select a reverse proxy with which the destination IP address is associated and forwards the network packet to the selected reverse proxy. In some implementations, the service provider 108 may access a database which stores the mapping between the destination IP address and the reverse proxies. Based on the selected reverse proxy, the service provider 108 may forward the network packet to one or more appropriate computing resources, including resource 110A, resource 110B, and resource 110C.

Resources 110A/B/C may be virtual machine images or instances which receive the network packets, performs any tasks as requested in the network packets, and transmits a response back to the client 102. Example of resources 110A/B/C may include, but are not limited to, compute resources (e.g., physical and/or virtual computer systems), storage resources (e.g., physical and/or virtual disks, logical data containers, data objects, databases, database records, etc.), identities, policies, and/or other resources that may be offered by a computing resource service provider. Each resource of the resources 110A/B/C may be associated with its own domain name and IP address which are generated as the resources are instantiated by the service provider 108. For example, the domain name of the resource 110A can be a string of characters which indicate a top-level domain (TLD), a second-level domain (SLD), and any other lower level domains providing the region in which the resources were instantiated.

Figure 2:
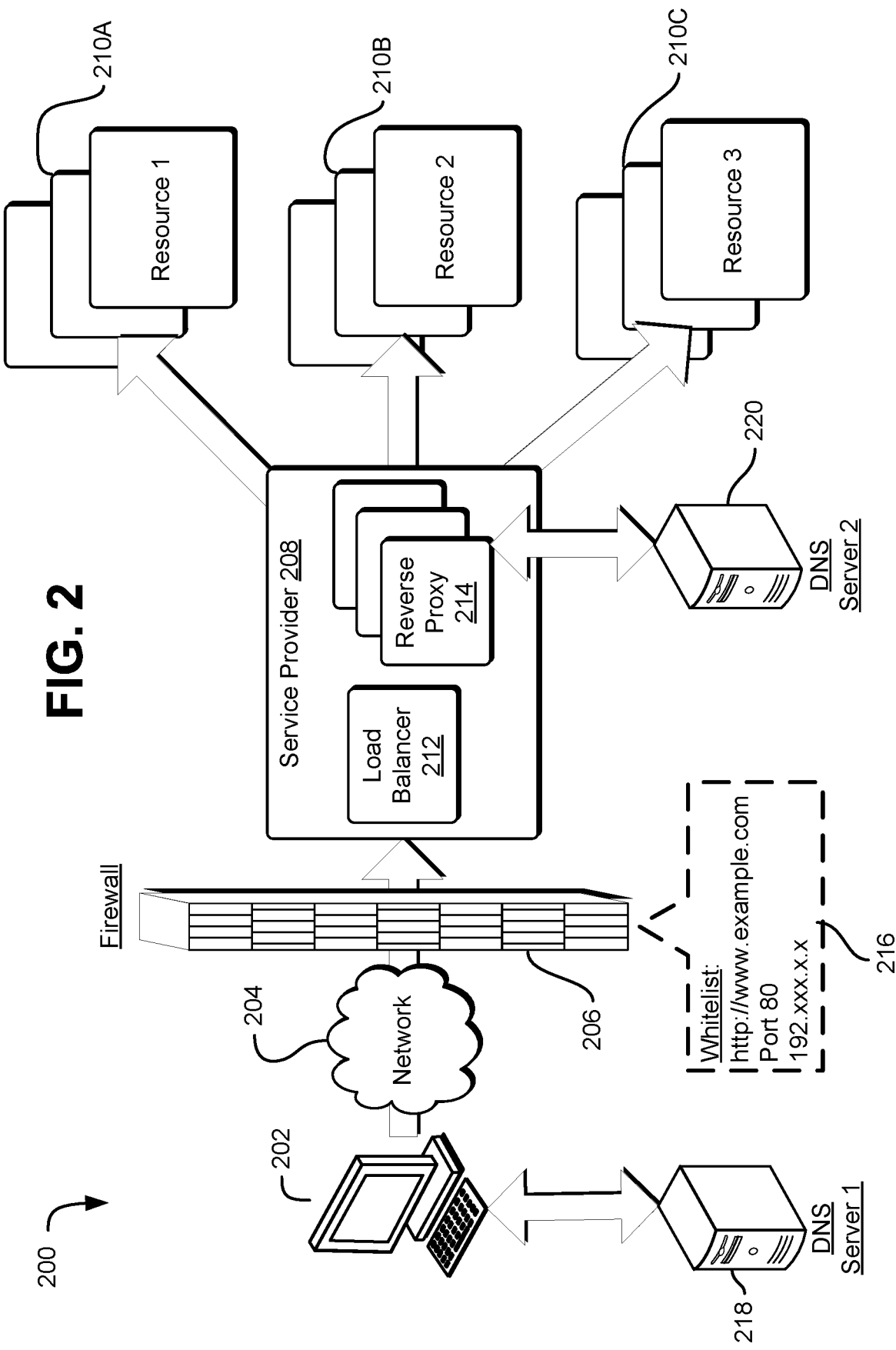
FIG. 2 illustrates an example diagram of a system including a load balancing component and reverse proxy component of the service provider in accordance with an embodiment.

FIG. 2 illustrates an example diagram of a system 200 including a load balancing component and reverse proxy component of the service provider in accordance with an embodiment. In an embodiment, the service provider 208 includes a load balancer 212 and a reverse proxy 214. The client 202 may be the client 102 discussed above in connection with FIG. 1. The service provider 208 may be the service provider 108 discussed above in connection with FIG. 1. Firewall 206 may be the firewall 106 discussed above in connection with FIG. 1. The resources 210A/B/C may be the resources 110A/B/C discussed above in connection with FIG. 1.

In one embodiment, the client 202 generates a network packet that needs to be transmitted to resources 210A/B/C. In some embodiments, the destination IP address associated with the resources 210A/B/C is not identified by the client 202. In such example, the client 202 first examines its cache to determine whether the destination IP address corresponding to the domain name is available. If not, the client 202 instead provides a domain name to the DNS server 218 which resolves the domain name and provides the destination IP address associated with such domain name. In some embodiments, the DNS server 218 may identify that the domain space associated with the domain name resides at a different server, and accordingly refers the request of the client 202 to one or more name servers until the destination IP address is resolved. In response to the destination IP address being identified, the client 202 may generate a network packet containing the destination IP address. In several embodiments, the client 202 or any other computing systems may configure a routing table of the DNS server 218 in which the domain names may continue to be updated with the corresponding destination IP address.

The network packet may contain a Hypertext Transfer Protocol (HTTP) request which permits the client 202 to transmit information to one or more of the resources 210A/B/C. For example, examples of information provided in a HTTP request include source port, proxies, destination IP address, destination port, host, protocols, requesting methods and content, user agents, referring pages, cookies, connection controls, cash controls, authorizations and the like. In another example, a network packet may contain a File Transfer Protocol (FTP) request which allows larger files to be transferred between client 202 and one or more of the resources 210A/B/C. It must be noted that although the present disclosure mainly associates network packets with HTTP request, it is contemplated that embodiments are not limited to HTTP or FTP protocols; rather, as used herein, the network packet is contemplated to be generated from any types of internet protocol request that may represent application data. For example, the data in the network packet may be of any type and may transit in any fashion appropriate to the implementation, For example, the data may transit as traffic over a network, and may be transacted via one or more network protocols at any layer or other level of abstraction. Examples include application layer protocols such as Border Gateway Protocol ("BGP"), Dynamic Host Configuration Protocol ("DHCP"), Authentication, Authorization, and Accounting ("AAA"), Authentication, Authorization, and Accounting with Secure Transport ("AAAS"), Domain Name System ("DNS"), File Transfer Protocol ("FTP"), Hypertext Transfer Protocol ("HTTP"), Internet Message Access Protocol ("IMAP"), Lightweight Directory Access Protocol ("LDAP"), Media Gateway Control Protocol ("MGCP"), Network News Transfer Protocol ("NNTP"), Network Time Protocol ("NTP"), Post Office Protocol ("POP"), Open Network Computing ("ONC"), Remote Procedure Call ("RPC"), RADIUS, Real-Time Transport Protocol ("RTP"), Real Time Streaming Protocol ("RTSP"), Routing Information Protocol ("RIP"), Session Initiation Protocol ("SIP"), Simple Mail Transfer Protocol ("SMTP"), Simple Network Management Protocol ("SNMP"), Secure Shell ("SSH"), Terminal Access Controller Access Control System ("TACACS"), Telnet, Transport Layer Security ("TLS"), Secure Sockets Layer ("SSL"), Extensible Messaging and Presence Protocol ("XMPP"), and the like. Other examples include transport layer protocols such as Transmission Control Protocol ("TCP"), User Datagram Protocol ("UDP"), Datagram Congestion Control Protocol ("DCCP"), Stream Control Transmission Protocol ("SCTP"), Resource Reservation Protocol ("RSVP"), and the like. Yet other examples include Internet layer protocols, such as Internet Protocol ("IP") (including IPv4 and IPv6), Internet Control Message Protocol ("ICMP") (including ICMPv6, ECP, IGMP, IPsec, and the like. Still other examples include link layer protocols such as Address Resolution Protocol ("ARP"), Neighbor Discovery Protocol ("NDP"), Open Shortest Path First ("OSPF"), Layer 2 Tunneling Protocol ("L2TP"), Point-to-Point Protocol ("PPP"), Medium Access Control ("MAC"), and the like. In some embodiments, the data may be transmitted as a series of packets or other quanta, such as network packets, that may conform with one or more of network protocols, such as one of the network protocols enumerated immediately above. The attributes of such quanta (e.g., length, format, metadata) may be defined by one or more of the network protocols used.

The firewall 206 receives the network packet communicated through the network 204. Once received, the firewall 206 examines the destination IP address (and port number, if necessary) as provided in the IP header of the network packet. If the firewall determines that the destination IP address is in the allowlist 216, the firewall forwards the network packet to the service provider 208.

The service provider 208 receives the network packet transmitted through the firewall 206, identifies the destination IP address of the network packet, and determines one or more reverse proxies 214 associated with the resources 210A/B/C. In several embodiments, the load balancer 212 is a computing system or a component thereof that distributes workload (e.g., network packets) across multiple computing resources, such as computers, a computer cluster, network links, central processing units, reverse proxies, or disk drives. In one embodiment, the load balancer 212 can be configured to listen for network packets transmitted through a network port (e.g., port 80). If the network packet is detected in the network port, the load balancer 212 determines a reverse proxy from a plurality of reverse proxies 214 based on the destination IP address. In some embodiments, the load balancer 212 selects a reverse proxy 214 from a reverse proxy group associated with the destination IP address based on availability of such reverse proxy. In those embodiments, the selection of the reverse proxy 214 can be based on a round-robin balancing method in which successive network packets can be distributed equally among the reverse proxies 214 in the reverse proxy group. In other embodiments, the round-robin balancing method can be weighted towards a first reverse proxy, so that more network packets can be transmitted as compared to the remaining reverse proxies in the group. In yet other embodiments, the load balancer 212 may select a reverse proxy 214 based on the availability of the virtual computing resources that will receive the network packet. In this implementation, the load balancer 212 may ping (e.g., TELNET ping) each reverse proxy 214 within the reverse proxy group and sends the network packet to the reverse proxy 214 that provides a response to the ping. The load balancer 212 then sends the network packet to the selected reverse proxy 214.

In some embodiments, the service provider 208 may include a deep packet inspection ("DPI") component (not shown) that may examine the application data (e.g., data or code payloads) of the packet to ensure that the network packet can be forwarded to another entity if necessary. As another method of packet filtering in addition to the firewall 206, the DPI of the service provider 208 may detect vulnerabilities that can be caused by the network packet even if the destination IP address indicates that the network packet can pass through the firewall 206. For example, a network packet having the allowlisted destination IP address may contain an SQL injection code which may alter or delete data stored in resources 210A/B/C. To prevent such events, the DPI can be configured to parse SQL statements in the network packet and perform one or more security actions, such as dropping the packet, if the parsed SQL statements may include suspicious SQL syntax. If the DPI determines that the network packet is safe to proceed, the service provider 208 forwards the network packet to the selected reverse proxy 214.

The reverse proxy 214 receives the network packet and forwards the network packet to the one of the resources 210A, 210B, or 210C based on the domain name of the network packet. In several embodiments, the reverse proxy 214 is a type of proxy server that retrieves data on behalf of a client (e.g., client 202) from one or more servers (e.g., resources 210A/B/C). These data are then returned to the client as if they originated from the service provider (e.g., service provider 208) itself and does not expose the IP addresses or FQDN of the resources. In one embodiment, the reverse proxy 214 may submit the domain name of the network packet and/or the FQDN associated with the destination IP address to the DNS server 220 to identify the IP address of the corresponding resource 210A, 210B, or 210C. Similar to the DNS server 218 above, the DNS server 220 may refer to other name servers to resolve the domain name to an IP address of the resource. In some implementations, both the client 202 and the reverse proxy 214 may perform the DNS lookup through the same DNS server, which may include DNS server 218 or DNS server 220.

In several embodiments, the DNS server 220 may include a routing table in which the domain name of the network packet or any other FQDN associated with resources 210A, 210B, or 210C can be routed to the appropriate resource IP address. The routing table can be periodically updated so that any new or existing domain information can be assigned with a different resource IP address. As a result of the updates, the DNS server 220 may control the egress rules of the reverse proxy 214 which may accommodate the rather transient nature of virtual computing resources, which can be instantiated or removed at any time depending on the client needs or scalability.

In other implementations, the reverse proxy 214 may configure its egress rules to forward any packets with a first domain name to another destination identifier such as FQDN associated with resources 210A/B/C. For example, the reverse proxy 214 may listen to port 443 and perform a proxy pass function to forward network packets having domain name http://xx.example.com to a FQDN of the resource which is instead xx.us-west-2.exampleresourceservice.com:443. Once the domain name of the resource 210A, 210B, or 210C is identified, the reverse proxy 214 may submit the FQDN to the DNS server so that the IP address of the resource domain is determined.

As a result of the resource domain being determined, the reverse proxy 214 forwards the network packet to one or more corresponding resources 210A/B/C, which in turn processes any application data within the network packet and generates a response for further processing.

Figure 3:
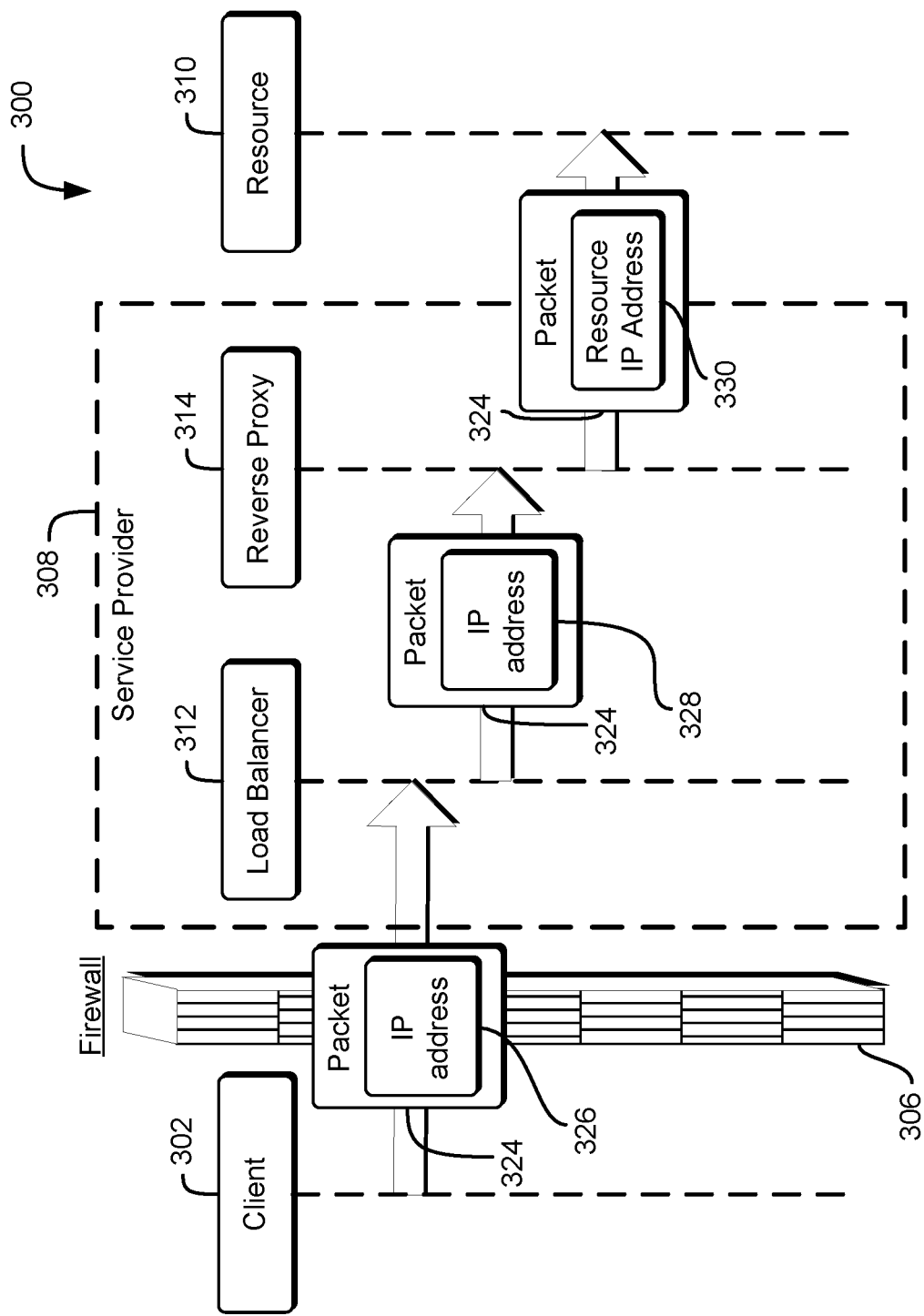
FIG. 3 illustrates an example sequence diagram for a reverse proxy service in accordance with an embodiment.

FIG. 3 illustrates an example sequence diagram 300 for a reverse proxy service of FIG. 2 in accordance with an embodiment. Initially, the client 302 generates a network packet (packet) 324 to communicate with resource 310. Packet 324 contains destination IP address 326, which is an IP address associated with the domain name as provided by the service provider 308. As previously indicated above, the destination IP address 326 can be determined based on a DNS lookup performed by the DNS server, including DNS server 218 and/or 220 of FIG. 2. The client then transmits the packet 324 through a network, such as network 104 of FIG. 1 or network 204 of FIG. 2. The network packet, before, during, or after being transmitted through the network, can be intercepted by the firewall 306. The firewall 306 parses the packet 324 to identify the destination IP address 326 and determine whether the packet 324 should continue to be transmitted or dropped. In one example, the firewall 306 may be configured with a allowlist which provides a list of IP addresses, ports, and domain name, in which the firewall 306 determines that the packet 324 should be allowed to be forwarded if the destination IP address matches with an IP address provided in the allowlist of the firewall 306. If found on the allowlist, the firewall 306 allows the packet 324 to be transmitted to the service provider 308. If not found on the allowlist, the firewall 306 drops, blocks, or otherwise denies the packet 324 from further processing. In another example, the firewall 306 may be configured with a blocklist which provides a list of IP addresses, ports, and domain name, in which the firewall 306 determines that the packet 324 should be blocked. In such example, the firewall 306 may block the incoming network packet if its destination IP address is found in the blocklist.

In response to the firewall 306 permitting the network packet to continue to be transmitted, the load balancer 312 of the service provider 308 receives the packet 324 then determines a reverse proxy 314 that is associated with the destination IP address 326. As described herein, the load balancer 312 may submit a query to a database (not shown) to retrieve a reverse proxy group corresponding to the destination IP address 326 after which a reverse proxy 314 can be selected. Once the reverse proxy 314 is determined, the load balancer 312 forwards the packet 324 to the reverse proxy 314. In some implementations, the packet 324 forwarded from the load balancer 312 may be identical to the packet 324 initially generated by the client 302. In other implementations, the packet 324 from the load balancer 312 may be modified by adding or substituting the destination IP address with another destination IP address 328 which may indicate the IP address of the reverse proxy 314 or the IP address of the resource 310.

The reverse proxy 314 receives the network packet 324 and first obtains the domain name associated with the packet 324. In some embodiments, the domain name can be obtained through processing the destination IP address 326 or the IP address 328. The reverse proxy 314 then determines the IP address 330 of the resource 310 based on the identified domain name. As described above, the determination of the resource IP address 330 can be performed by the reverse proxy 314 submitting the obtained domain name to the DNS server 218 or 220. After the resource IP address 330 is determined, the reverse proxy 314 substitutes IP address 328 with the resource IP address 330 then forwards the packet 324 to resource 310. In several embodiments, resource 310 may generates a response based on the data payload of the packet 324 which can be transmitted back to the client 302.

It should be noted that service provider 308 may be service provider 208 discussed above in connection with FIG. 2, client 302 may be client 202 of FIG. 2, firewall 306 may be firewall 206 of FIG. 2, load balancer 312 may be load balancer 212 of FIG. 2, reverse proxy 314 may be reverse proxy 214 of FIG. 2, and resource 310 may be any of resource 210A, 210B, or 210C.

It should be appreciated that alternate embodiments may have numerous variations from that described above. For example, in an embodiment, the reverse proxy 314 may perform the load balancing operations which the destination IP addresses are directly associated with resources 310. In such embodiment, the load balancer 312 can be a switch of a router which simply forwards the packet 324 to the reverse proxy 314. Numerous other variations are within the spirit of the present disclosure.

Figure 4:
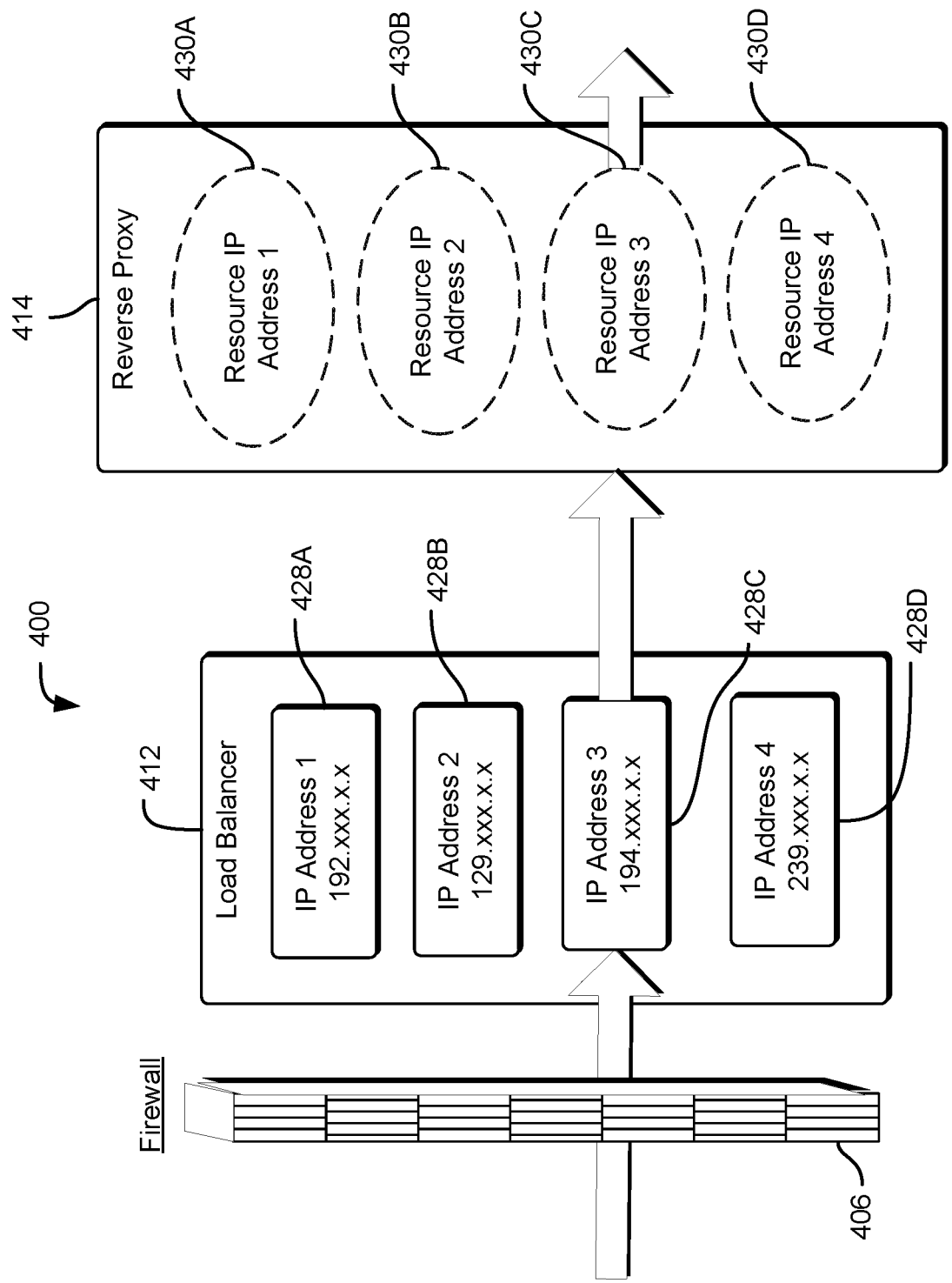
FIG. 4 illustrates an example configuration of the load balancer of a service provider in accordance with an embodiment.

FIG. 4 illustrates an example configuration 400 of a load balancer 412 of a service provider in accordance with an embodiment. Load balancer 412 may be load balancer 312 discussed in connection with FIG. 3 above, firewall 406 may be firewall 306 discussed in connection with FIG. 3, and reverse proxy 414 may be reverse proxy 314 in connection with FIG. 3. In an embodiment, the network packet (such as packet 324 in FIG. 3) is generated by a client device (such as client 302 in FIG. 3) and is forwarded through the firewall 406. In an embodiment, the network packet includes a destination IP address (such as IP address 326) which may be identified through a DNS server lookup function. After the firewall 406 confirms that the destination IP address is in the allowlist, the network packet is forwarded to the load balancer 412. The load balancer 412 includes a plurality of destination IP addresses 428A/B/C/D, each of which is associated with corresponding resources. For example, destination IP address 428A may be associated with a first set of resources (such as resource 210A of FIG. 2), destination IP address 428B may be associated with a second set of resources (such as resource 210B of FIG. 2), destination IP address 428C may be associated with a third set of resources (such as resource 210C of FIG. 2), and destination IP address 428D may be associated with a fourth set of resources (not shown). The load balancer 412 in certain time intervals may communicate with firewall 406 to add newly assigned destination IP addresses, so that any future requests made by the client to the new resources will not be dropped by the firewall 406. In several embodiments, a set of resources assigned to the destination IP address 428A, 428B, 428C, or 428D may provide the same service. In other implementations, however, each resource in the set of resources can perform a different function.

The load balancer 412 receives the network packet transmitted through the firewall 406. The load balancer then determines whether the destination IP address in the network packet matches one of the destination IP addresses 428A, 428B, 428C, or 428D. If so, the load balancer selects such destination IP address in the load balancer, in this case destination IP address 428C (194.xxx.x.x). The load balancer 412 may then select a reverse proxy 414 that is associated with the destination IP address 428C. In some embodiments, the load balancer 412 first determines a reverse proxy group associated with the destination IP address 428C, and then selects the reverse proxy 414 that is available to respond to the client network packet. In other embodiments, the load balancer will simply select a reverse proxy 414 without determining a reverse proxy group. Once the reverse proxy 414 is determined, the load balancer forwards the network packet to reverse proxy 414 for further processing. The selected reverse proxy 414 includes a set of resource IP addresses 430A, 430B, 430C, and 430D associated with the reverse proxy 414, at which the reverse proxy 414 determines to which resource IP address the network packet should be forwarded. The process in determining the appropriate resource IP address is further described herein below.

Figure 5:
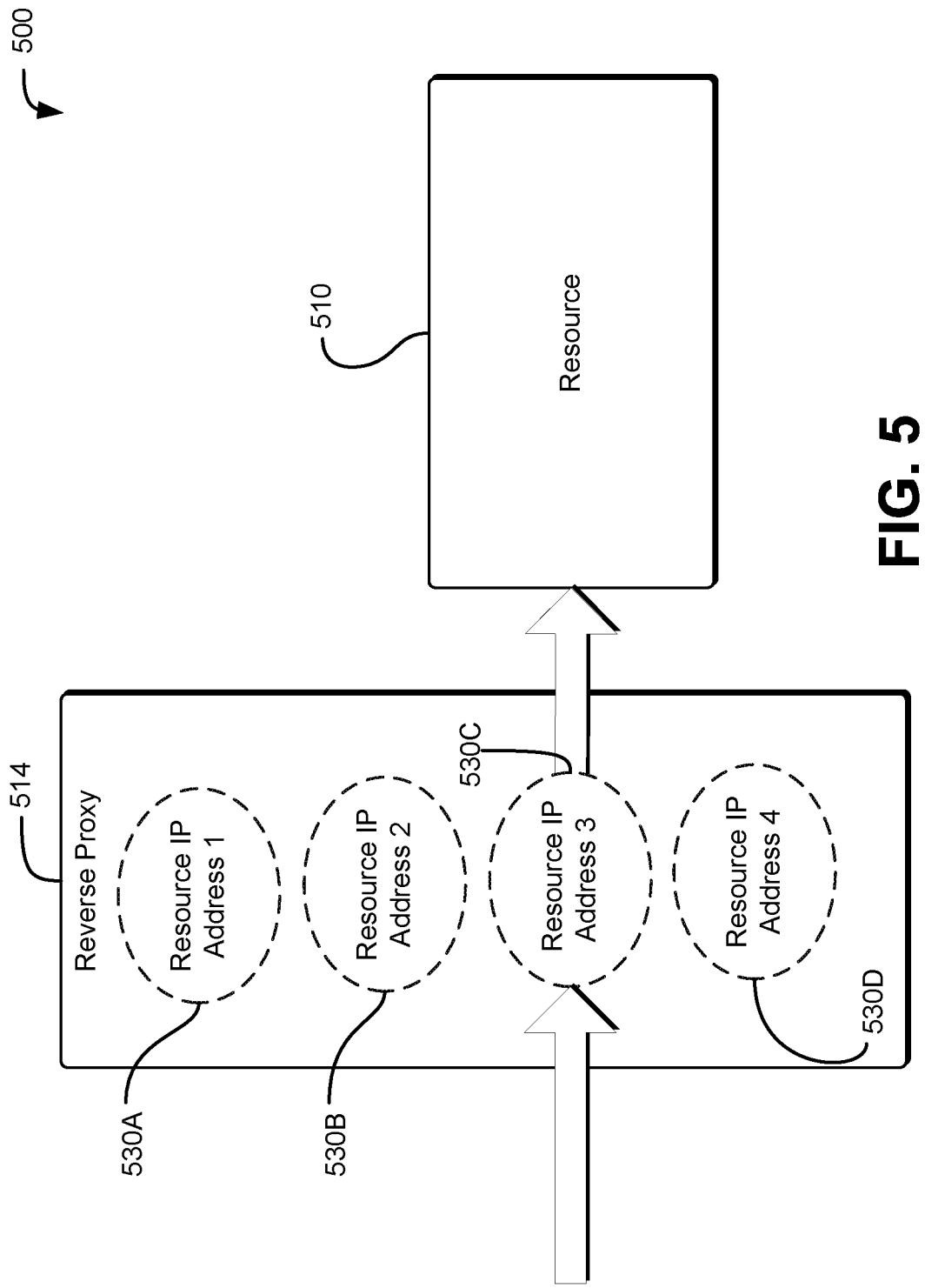
FIG. 5 illustrates an example configuration of a reverse proxy of a service provider in accordance with an embodiment.

FIG. 5 illustrates an example configuration 500 of a reverse proxy 514 of a service provider in accordance with an embodiment. Reverse proxy 514 may be reverse proxy 314 in connection with FIG. 3 and/or reverse proxy 414 in connection with FIG. 4, resource IP addresses 530A/B/C/D may be resource IP addresses 430A/B/C/D in connection with FIG. 4, and resource 510 may be resource 310 in connection with FIG. 3. As described herein above, the load balancer (such as load balancer 412 of FIG. 4) may forward the network packet (such as packet 324 of FIG. 3) to the reverse proxy 514 once the load balancer determines that the reverse proxy 514 is associated with the destination IP address (such as destination IP address 428C of FIG. 4). The reverse proxy 514 then receives the network packet and forwards the packet to the resource 510.

In one embodiment, the reverse proxy 514 parses the network packet to identify its domain name then translates the domain name to the resource IP address, in this case resource IP address 530C. The reverse proxy 514 translates the domain name (or, in other embodiments, FQDN associated with the destination IP address) through submitting the domain name in a DNS server (such as DNS server 220 of FIG. 2). For example, the reverse proxy 514 may generate and submit a DNS command such as "nslookup example.com", and in response the DNS server may provide a number of resource IP addresses such as resource IP address 530C. In another example, the reverse proxy 514 may parse the network packet to determine that the domain name associated with the packet is "example.com/accounts" then submits another type of DNS command such as "ping example.com/accounts." In response, the DNS server may respond with another resource IP address such as IP address 530B. In another embodiment, the reverse proxy 514 may access a database instead of the DNS server to identify the resource IP address 530C based on the domain name. For example, the resource IP address and the corresponding domain name can be inserted into the table of a database which can be hosted by the reverse proxy 514 or a separate server (not shown). In response to receiving the network packet from the load balancer, the reverse proxy 514 may submit a query statement containing the domain name of the network packet (such as "SELECT IP_address FROM resources WHERE domain_name='example.com'") and retrieve the results of the query which will be the IP address of the resource associated with the domain name.

In yet another embodiment, the reverse proxy 514 may already store the resource IP addresses 530A, 530B, 530C, and 530D in a datastore. In this embodiment, the reverse proxy 514 does not perform a DNS lookup. Rather, the reverse proxy 514 may implement a proxy pass function which maps a domain name path to one of the resource IP addresses 530A/B/C/D. For example, consider the reverse proxy 514 as a NGINX web server. The reverse proxy 514 may include the following C programming functions such as "location /path1/ {proxy_pass 'resource IP address 530A'; location/path2/ {proxy_pass 'resource IP address 530B';} location /path3/ {proxy_pass 'resource IP address 530C';} location/path4/proxy pass 'resource IP address 530D';}." In other words, the reverse proxy 514 may parse the domain name of the network packet and determines to which resource IP address the packet should be forwarded based on the domain extension paths. In this example, the reverse proxy 514 determines that the domain name associated with the packet is "example.com/path3" then utilizes the proxy pass function to determine resource IP address 530C based on the "path3" domain name.

In response to determining the resource IP address 530C, the reverse proxy 514 may forward the network packet to the resource 510 which corresponds to the resource IP address 530C. The resource 510 can accept the packet, strip all headers, and process the data payload in the packet. After processing the data payload, the resource 510 may generate a response, including any data requested by the client (such as client 302 of FIG. 3) or a status code (e.g., HTTP 200 OK status response).

Figure 6:
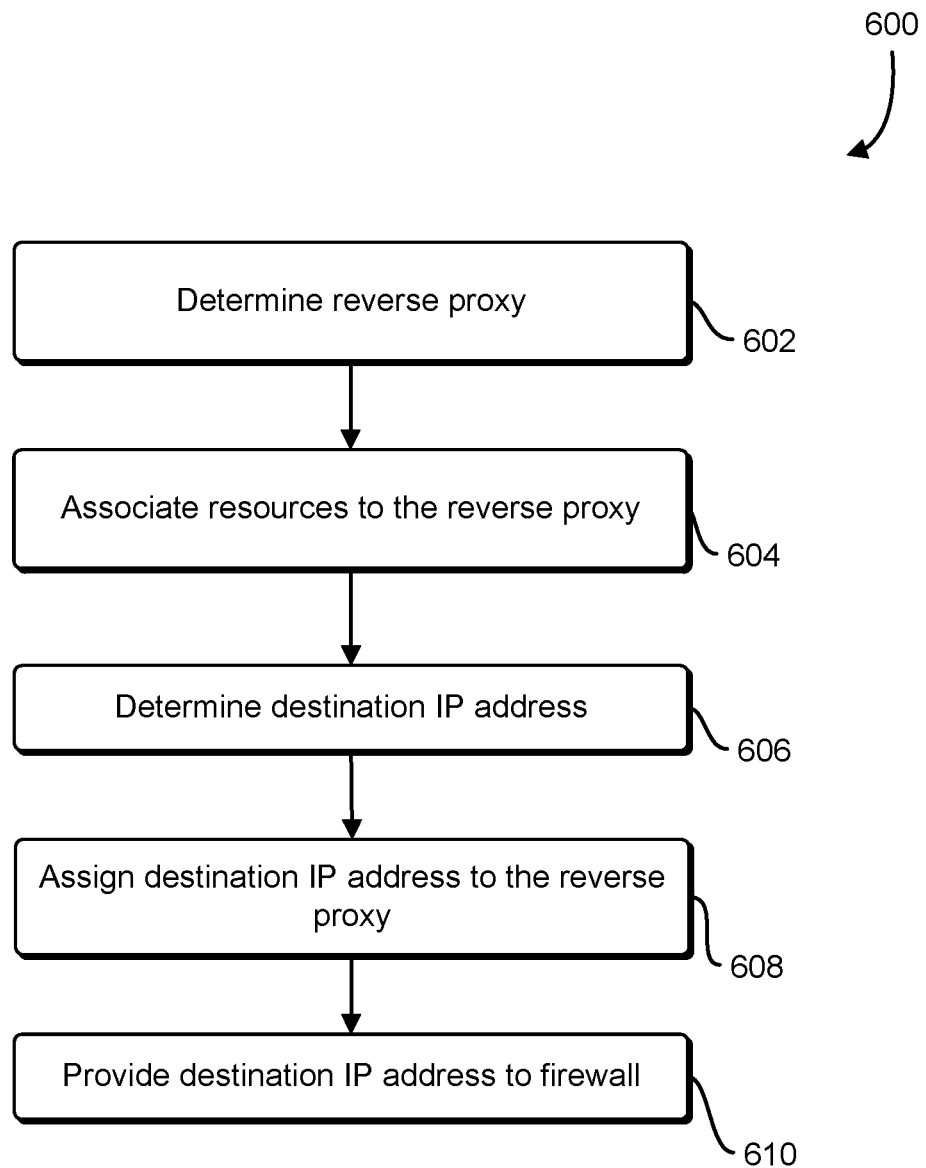
FIG. 6 illustrates an example flowchart for generating a destination IP address for the firewall access control list in accordance with an embodiment.

FIG. 6 illustrates an example flowchart for generating a destination IP address for the firewall (such as firewall 206 of FIG. 2) in accordance with an embodiment. The process 600 of FIG. 6 is performed in response to a trigger event such as the service provider (such as service provider 208 of FIG. 2) generating at least one computing resource (such as resource 210A of FIG. 2) that may be utilized by a client (such as client 202 of FIG. 2). In one example, the client requires interaction with the virtual computing resources to perform a series of tasks such as retrieving a set of data from a database hosted in the virtual computing resources. In another example, the client requires interaction with a third-party service provider which provides its services through the virtual computing resources. For example, a user may make a spoken request to a personal assistant device to add a new event to their online calendar, where the calendar is provided by a third-party service. In another example, a user may use a graphical interface on a mobile device (e.g., a smart phone) to interact with an online shopping service. In both of these examples, interaction with a third-party service (e.g., the online calendar service, the online shopping service, etc.) may require the client to communicate with, i.e., send network packets, to virtual computing resources though the firewall may block any client network packets from being transmitted to the computing resources. In yet another example, the user may host a client-side application which requires communication with the computing resources provided by service provider (such as service provider 208 of FIG. 2) to ensure scalability of the computing capacity. The client-side application, however, may also run a secure firewall which only allows small list of endpoints to communicate with said application. In any of these examples, the service provider may perform process 600 to ensure that clients may fully communicate with the computing resources without its packets being blocked by firewall, as well as providing only a small number of IP addresses to minimize any risks associated with creating a big hole in the firewall, i.e., a firewall with too many exceptions.

At step 602, the service provider determines a reverse proxy. In one implementation, a reverse proxy can be a virtual application server (e.g., NGINX) that can be instantiated and be associated with a plurality of resources. The service provider then associates a plurality of resources to the reverse proxy (step 604). In several embodiments, the IP addresses and/or domain names of each resource can be associated with the reverse proxy. The association of the resource IP addresses with the domain names can be submitted to the DNS server to allow a later DNS lookup. In another implementation, the association of the resource IP addresses with the domain names can be stored in a separate database table to enable a database query to be executed. In yet another implementation, the reverse proxy may construct a proxy pass function in which the domain name can be passed as a conditional statement which may generate the corresponding resource IP address as a result of satisfying the condition.

At step 606, the service provider determines a destination IP address. In several embodiments, the destination IP address may be in IPv4 or IPv6 format. The determination of the destination IP address may occur before, in parallel, or after step 602, and/or may occur before, in parallel, or after step 604. After the destination IP address is determined, the service provider assigns the destination IP address to the reverse proxy (step 608). In some implementations, the service provider may assign the destination IP address a reverse proxy group that includes at least one reverse proxy associated with a plurality of resources that can process a request sent from a client computer. At step 610, the service provider may then provide the destination IP address to the firewall (such as firewall 206 in FIG. 2). In response, the firewall may include the destination IP address to the firewall allowlist, to enable network packets addressed to the destination IP address can be allowed for transmission to the service provider.

Figure 7:
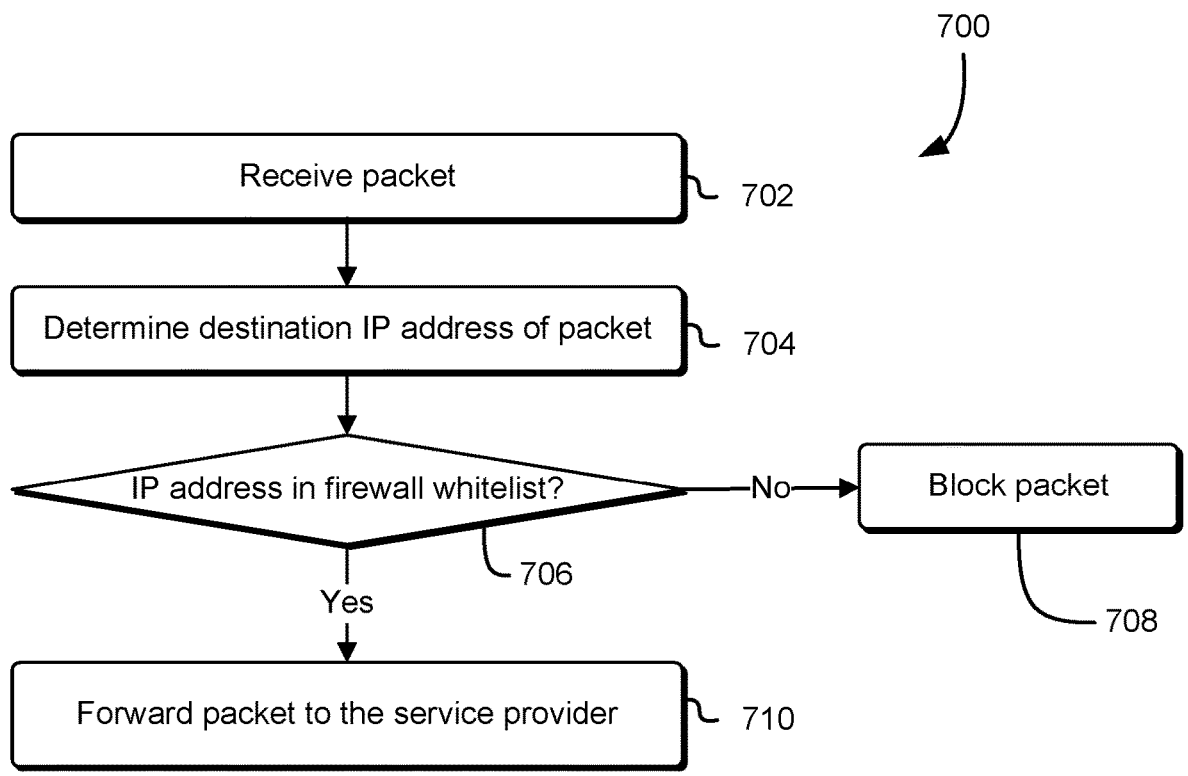
FIG. 7 illustrates an example flowchart of a firewall in accordance with an embodiment.

FIG. 7 illustrates an example flowchart of a firewall (such as firewall 206 of FIG. 2) in accordance with an embodiment. The process 700 of FIG. 7 is performed in response to a trigger event such as the client (such as client 202 of FIG. 2) generating a network packet then providing such packet to the firewall. At step 702, the firewall receives the packet. The firewall then parses the network packet to determine the destination IP address of the network packet (step 704). In one embodiment, the firewall may inspect the header of the packet and extracts the data associated with the destination address field. The firewall then determines whether the destination IP address is in the firewall allowlist (step 706). In another implementation in which the firewall deploys a blocklist model, the firewall determines whether the destination IP address is not in the firewall blocklist. In other words, the firewall determines whether the destination IP address can be allowed for further transmission.

If the destination IP address is not in the firewall allowlist ("No" path from step 706), the firewall may block the packet from further transmission (step 708). The firewall may generate a response message back to the client that the packet was blocked from further transmission. For example, a response message can be an HTTP response code 403, which indicates that the destination IP address is forbidden from further access. If the destination IP address is in the firewall allowlist ("Yes" path from step 706), the firewall can forward the network packet to the service provider (step 710). In one implementation, the firewall forwards the allowed network packet to the load balancer (such as load balancer 212 of FIG. 2) of the service provider. Thereafter, the firewall terminates process 700.

Figure 8:
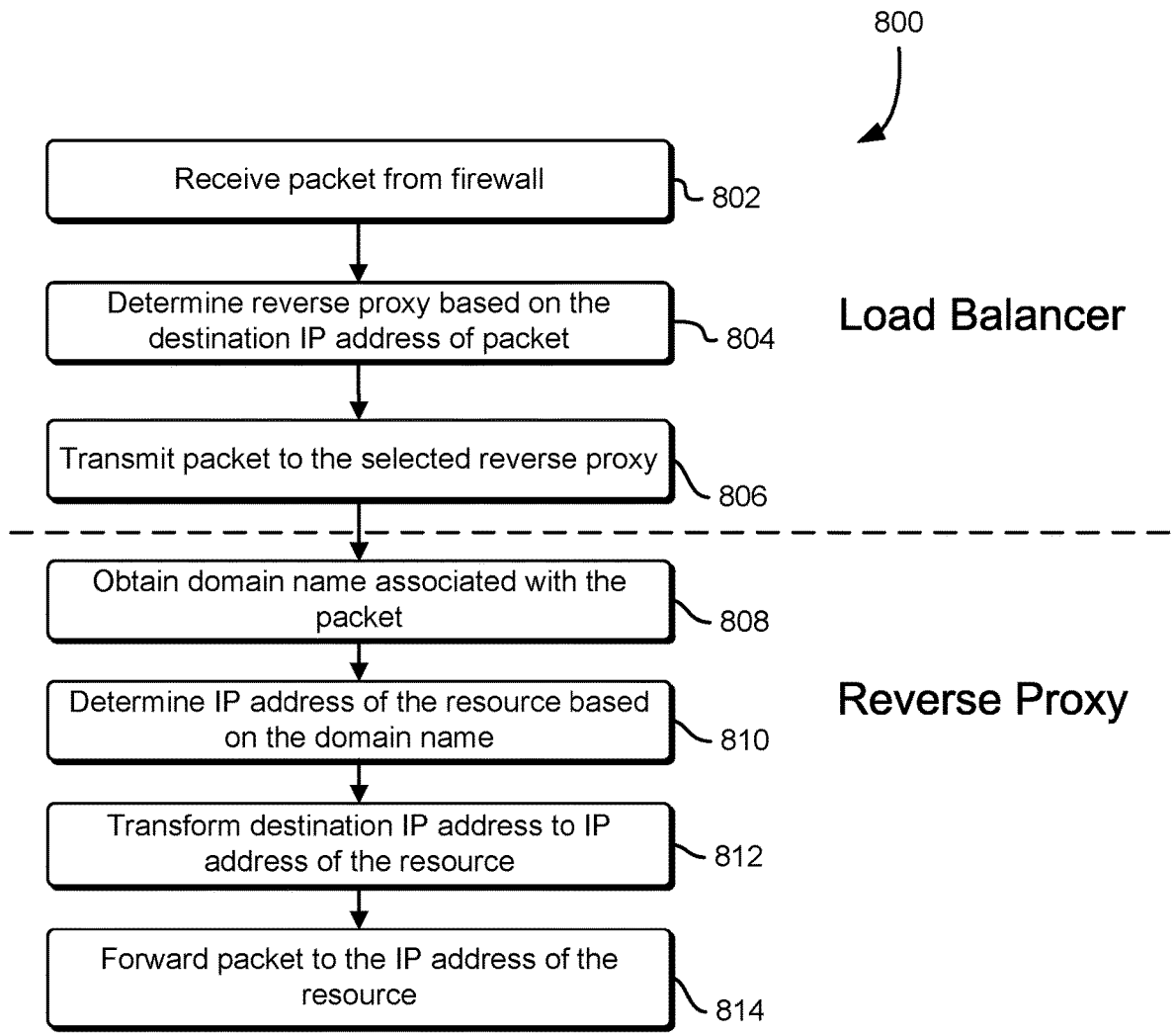
FIG. 8 illustrates an example flowchart of a service provider forwarding network packets to computing resources in accordance with an embodiment.

FIG. 8 illustrates an example flowchart of a service provider (such as service provider 208 of FIG. 2) forwarding network packets to computing resources (such as resources 210A/B/C/D of FIG. 2) in accordance with an embodiment. The process 800 of FIG. 8 is initiated by service provider receiving packet from firewall (step 802). At step 804, the load balancer component of the service provider (such as load balancer 212 of FIG. 2) determines a reverse proxy based on the destination IP address of the received packet. In some embodiments, the load balancer searches whether the IP address in the packet matches one of the stored destination IP addresses. For example, the load balancer submits a query in the routing table of the load balancer to determine whether there is a matching destination IP address. At step 806, the load balancer of the service provider transmits the packet to the selected reverse proxy.

At the reverse proxy component (such as reverse proxy 214 of FIG. 2) of the service provider, domain name associated with the packet is obtained (step 808). In some implementations, the domain name obtained by the reverse proxy may be the same with the domain name initially submitted by the client (such as client 202 of FIG. 2) when generating the network packet. In other implementations, the domain name obtained by the reverse proxy may be different from the domain name of the original network packet. At step 810, the reverse proxy determines the resource IP address based on the obtained domain name. As described herein above, the determination of the resource IP address may be based on submitting the domain name of the packet in a DNS server to resolve the resource IP address. After the resource IP address is identified, the reverse proxy may transform the destination IP address to the resource IP address then attach the new IP address to the packet (step 812). At step 814, the reverse proxy forwards the packet to the resource IP address. The process 800 terminates thereafter.

Figure 9:
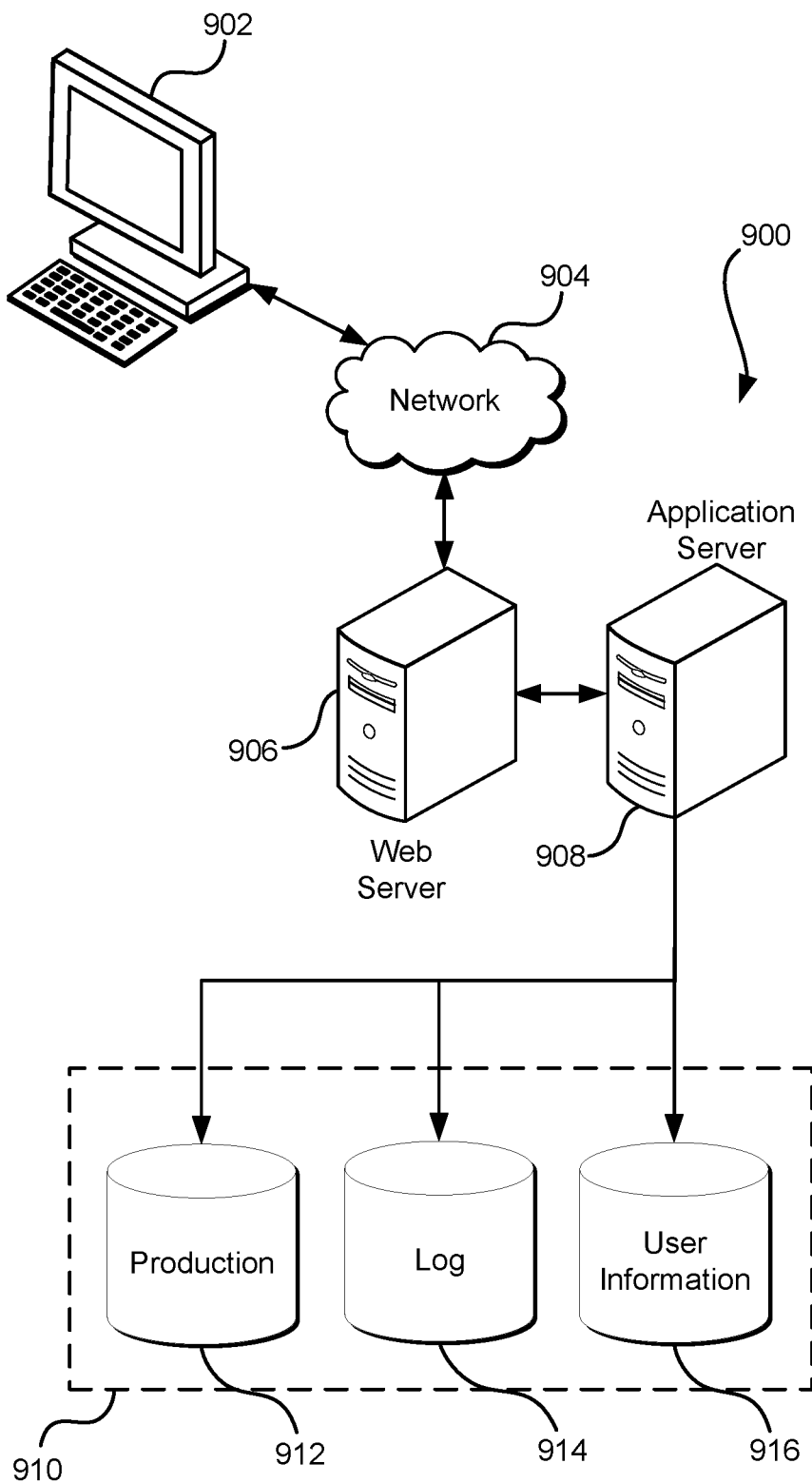
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network (such as network 204 of FIG. 2) that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering. In several embodiments, the system may further utilize a firewall (such as firewall 206 of FIG. 2) to control access of network packets being transmitted through the at least one network. For example, the protocol headers of the network packets can be inspected by the firewall and applied with a set of security rules in ACL of the firewall to determine whether the network packet should be blocked or allows through the network.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. For example, a first non-transitory computer-readable storage medium includes instructions to be executed by a load balancer of the service provider (such as load balancer 212 of FIG. 2), a second non-transitory computer-readable storage medium includes instructions to be executed by a reverse proxy of the service provider (such as reverse proxy 214 of FIG. 2), and a third non-transitory computer-readable storage medium includes instructions to be executed by a firewall (such as firewall 206 of FIG. 2). In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode identified to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a firewall that:
      receives a network packet; and
      as a result of a first destination Internet Protocol (IP) address of the network packet satisfying a firewall rule, forwards the network packet to a load balancer based at least in part on the first destination IP address, the first destination IP address corresponding to a domain name;
   the load balancer that:
      receives the network packet from the firewall; and
      selects, from a plurality of reverse proxies, a reverse proxy based on the first destination IP address; and
   the reverse proxy, wherein the reverse proxy:
      receives the network packet from the load balancer;
      determines, based at least in part on the domain name, a second destination IP address different from the first destination IP address;
      transforms the network packet to have the second destination IP address; and
      forwards the network packet to the second IP destination address.

2. The system of claim 1, wherein the first destination IP address is listed in a firewall allowlist as permitted for network transmission.

3. The system of claim 1, wherein:
   the first destination IP address is associated with a domain name in a first Domain Name System (DNS); and
   the second destination IP address is associated with a domain name in a second DNS.

4. The system of claim 1, wherein the load balancer:
   determines a reverse proxy group comprising the plurality of reverse proxies based on the first destination IP address; and
   selects the reverse proxy by using a load balancing algorithm.

5. The system of claim 1, wherein the second destination IP address is associated with a resource to which the network packet is forwarded.

6. A computer-implemented method, comprising:
   receiving a network packet from a first network location that applied a set of security rules to at least a first destination Internet Protocol (IP) address of the network packet;

selecting a reverse proxy based on the first destination IP address; and causing the reverse proxy to:

determine a second destination IP address based at least in part on a domain name corresponding to the first destination IP address, wherein the second destination IP address is different from the first destination IP address;

transform the network packet to include a second destination IP address; and forward the network packet to the second destination IP address.

7. The computer-implemented method of claim 6, wherein the network packet is generated based on a request from a client device, the request providing an identifier indicative of the first destination IP address.

8. The computer-implemented method of claim 7, further comprising:

providing the identifier to a naming system, the naming system determining the first destination IP address corresponding to the identifier;

receiving the first destination IP address from the naming system; and generating the network packet.

9. The computer-implemented method of claim 8, wherein the second destination IP address is associated with a second naming system.

10. The computer-implemented method of claim 9, wherein the reverse proxy determines the second destination IP address based on the identifier associated with the request.

11. The computer-implemented method of claim 6, wherein the set of security rules includes a set of destinations to which the network packet is permitted to be transmitted.

12. The computer-implemented method of claim 11, further comprising adding a rule to the set of security rules, wherein the rule indicates that the network packet is permitted to be transmitted to the first destination IP address.

13. The computer-implemented method of claim 12, further comprising blocking another network packet being transmitted to a third destination IP address to which the set of security rules cannot be applied.

14. One or more non-transitory computer-readable storage media having stored thereon executable instructions that, as a result of being executed by one or more processors of a computer system, cause the computer system to at least:

obtain, from a load balancer, a domain name associated with a network packet transmitted through a network device that applied a security rule to the network packet, the network packet including a first network Internet Protocol (IP) address corresponding to the domain name;

determine a second network IP address from a plurality of other network addresses based at least in part on the domain name, where the second network IP address is different from the first network IP address;

transform the network packet to include the second network IP address, thereby resulting in a transformed network packet; and forward the transformed network packet to the second network IP address.

15. The one or more non-transitory computer-readable storage media of claim 14, wherein the first network IP address is associated with a first domain system.

16. The one or more non-transitory computer-readable storage media of claim 14, wherein forwarding the transformed network packet to the second network IP address causes a computing resource to provide data as requested in the network packet.

17. The one or more non-transitory computer-readable storage media of claim 16, wherein the network device:

receives the first network IP address prior to the network packet being transmitted through the network device; and updates the security rule based on the first network IP address.

18. The one or more non-transitory computer-readable storage media of claim 14, wherein the instructions further comprise instructions that, as a result of being executed by the one or more processors, cause the computer system to:

invoke a proxy pass function, the proxy pass function receiving a destination identifier as an input and providing the second network IP address an output.

19. The one or more non-transitory computer-readable storage media of claim 14, wherein the instructions further comprise instructions that, as a result of being executed by the one or more processors, cause the computer system to:

provide the domain name to a naming system, wherein the naming system identifies the second network IP address based on the domain name; and receive the second network IP address from the naming system.

20. The one or more non-transitory computer-readable storage media of claim 14, wherein the instructions further comprise instructions that, as a result of being executed by the one or more processors, cause the computer system to:

generate a query based on the domain name;

submit the query to a database, wherein the database determines the second network IP address based on the domain name; and retrieve the second network IP address determined by the database.

21. The one or more non-transitory computer-readable storage media of claim 15, wherein the instructions to transform the network packet to have the second network IP address further comprise instructions that, as a result of being executed by the one or more processors, cause the computer system to:

identify a first header of the network packet, the first header including the first network IP address; and replace the first header with a second header, the second header including the second network IP address.

* * * * *